United States Patent [19]
Feldman et al.

[11] Patent Number: 6,126,379
[45] Date of Patent: Oct. 3, 2000

[54] APPARATUS FOR LIFTING APPLIANCES WITHIN THE INTERIOR OF A VEHICLE

[76] Inventors: Zeylik Y. Feldman, 941 N. Sierra Bonita #2, Los Angeles, Calif. 90046; Yakov Z. Feldman, 5315 Zelzah Ave., Apt. 19, Encino, Calif. 91316

[21] Appl. No.: 09/295,893

[22] Filed: Apr. 21, 1999

[51] Int. Cl.[7] .................................................. B60P 1/54
[52] U.S. Cl. ........................... 414/542; 254/4 R; 414/560
[58] Field of Search .................................... 414/560, 539, 414/540, 541, 542, 543, 549, 561; 212/327, 326, 319; 254/4 R, 4 B, 4 C

[56] References Cited

U.S. PATENT DOCUMENTS

| | | | |
|---|---|---|---|
| 2,177,525 | 10/1939 | Hendersen | 414/542 |
| 2,730,249 | 1/1956 | Edwards | 414/542 |
| 4,194,867 | 3/1980 | Bragg | 414/542 |
| 4,297,071 | 10/1981 | Dunbar | 414/542 |
| 5,338,147 | 8/1994 | Kucharczyk et al. | 414/542 |
| 5,486,082 | 1/1996 | Feldman et al. | 414/542 |

FOREIGN PATENT DOCUMENTS

| | | | |
|---|---|---|---|
| 4216709 | 11/1993 | Germany | 414/542 |
| 270258 | 11/1988 | Japan | 414/542 |
| 93/22157 | 11/1993 | WIPO | 414/542 |

*Primary Examiner*—Frank E. Werner
*Attorney, Agent, or Firm*—Merchant & Gould P.C.

[57] ABSTRACT

The present disclosure relates to an apparatus for moving appliances that includes a vehicle having a cargo area with a front region and a back region. The vehicle also includes a door for accessing the cargo area. A track is mounted within the vehicle. The track extends between the front and back regions of the cargo area. An extendable boom is slidably mounted on the track. The boom is movable between an extended orientation in which the boom is adapted to project outward through the door of the vehicle, and a retracted orientation. The present disclosure further includes a winch having a cable mounted on the boom, and a drive motor for raising and lowering the cable.

16 Claims, 2 Drawing Sheets

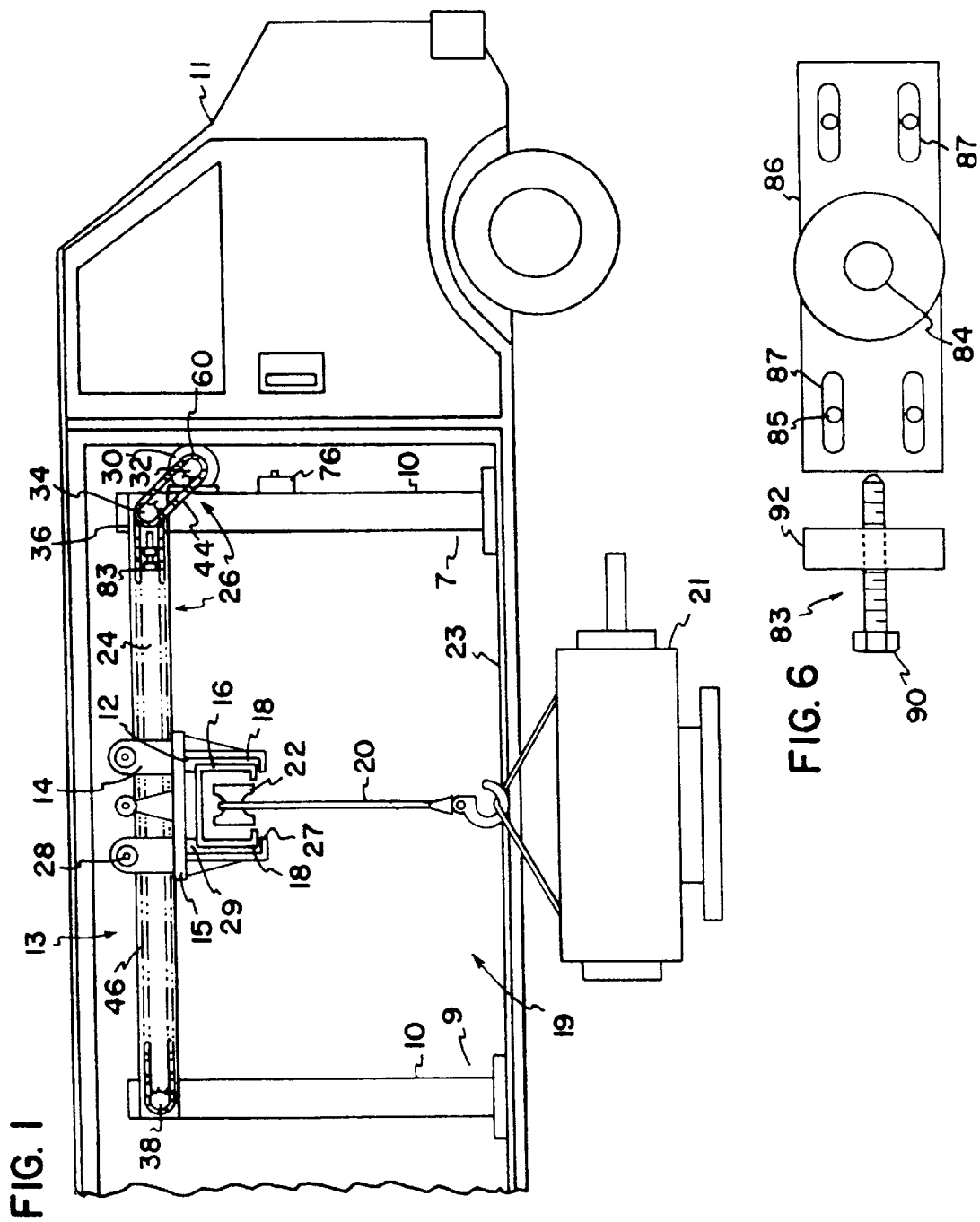

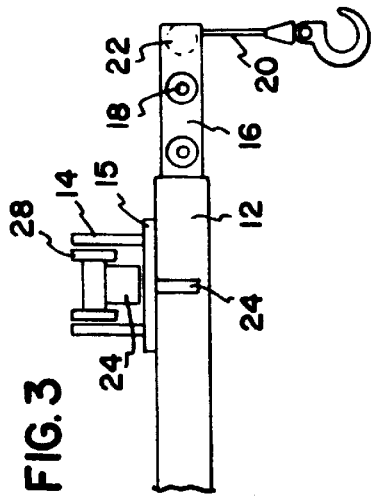
FIG. 3
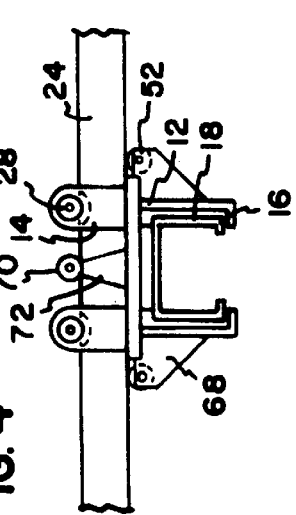
FIG. 4
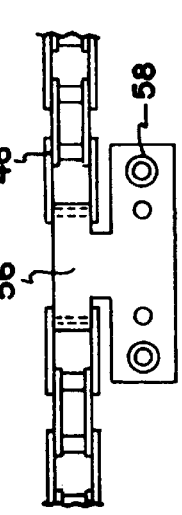
FIG. 5
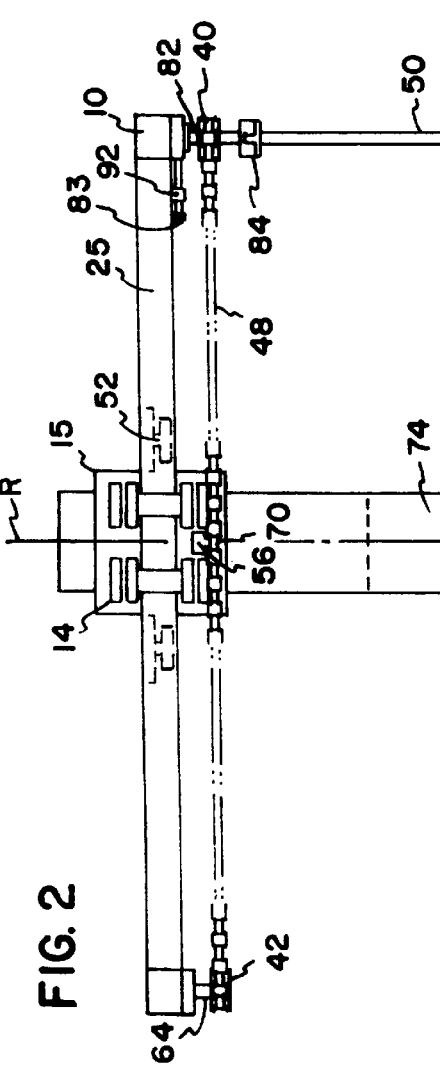
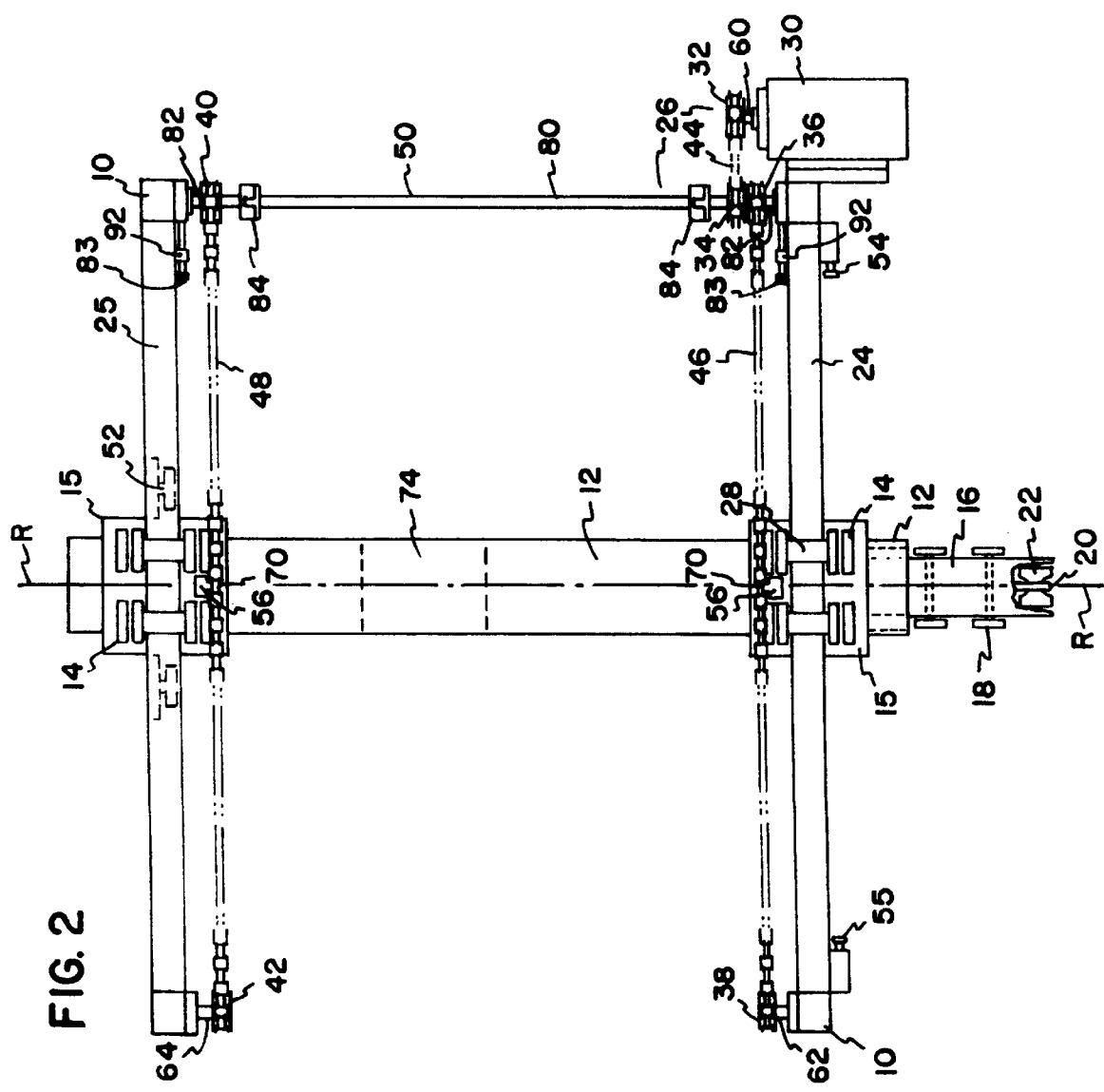
FIG. 2

APPARATUS FOR LIFTING APPLIANCES WITHIN THE INTERIOR OF A VEHICLE

TECHNICAL FIELD

This invention generally relates to an apparatus for loading and unloading heavy objects to and from a van, and more particularly to an apparatus having a boom extendible from the side door of a van, and winch operable with the boom.

BACKGROUND

The use of vans and smaller truck vehicles for service intensive businesses has proliferated due to their great versatility. Plumbing contractors, appliance repair contractors and other labor intensive type of services have long used vans because of their unique convenience. Unlike the open beds of trucks, vans provide a covered enclosure that can be locked and secured, thereby protecting their contents. Shelving and storage containers may be mounted on the interior walls of the van and access to the interior is usually provided from the rear by adjoining doors that swing outward away from the van and by a sliding door on the side of such vans. Often, it is desirable to transport heavy machinery, appliances, or other cargo from a remote location back to the main warehouse or shop for further service.

There are many commercial systems available for open trucks and vans that have hoist systems mounted in the truck or van that facilitate the loading and unloading of heavy cargo. An example of a commercial lift system is shown in U.S. Pat. No. 5,486,082, issued to Feldman et al., which is herein incorporated by reference. The system has a winch that successively winds and unwinds a cable. The system has two motors, a first motor moves a boom from a retracted to an advanced position, and the second motor controls the winding and unwinding of the cable. The system has a brake that prevents the unwinding of the winch. The system allows cargo to the lifted through a side door of a van, but is not capable of moving cargo between the front and back regions of a cargo area of the van.

SUMMARY OF THE INVENTION

One aspect of the present invention relates to an apparatus for moving appliances that includes a vehicle having a cargo area with a front region and a back region. The vehicle also includes a door for accessing the cargo area. A track is mounted within the vehicle. The track extends between the front and back regions of the cargo area. An extendable boom is slidably mounted on the track. The boom is movable between an extended orientation in which the boom is adapted to project outward through the door of the vehicle, and a retracted orientation. The apparatus further includes a winch having a cable mounted on the boom, and a drive motor for raising and lowering the cable.

Another aspect of the present invention relates to a lift apparatus with an extendible boom that is able to be moved between an extended orientation and a retracted orientation, while still maintaining maximum lift capacity. A further aspect of the present invention relates to a system with a winch that includes a cable mounted on the boom and a drive motor that raises and lowers the cable. Still another aspect of the present invention provides a lift mechanism capable of lifting cargo into a vehicle cargo area, and moving the cargo between the front and back of the cargo area.

There has thus been outlined, rather broadly, the more important features of the invention in order that the detailed description thereof that follows may be better understood, and in order that the present contribution to the art may be better appreciated. There are, of course, additional features of the present invention that will be described hereinafter and that will form the subject matter of the invention. Those skilled in the art will appreciate that the conception, upon which this disclosure is based, may readily be utilized as a basis for the designing of other devices and systems for carrying out the several purposes of the present invention. It is important, therefore, that the invention be regarded as including such equivalent constructions insofar as they do not depart from the spirit and scope of the present disclosure.

BRIEF DESCRIPTION OF THE DRAWINGS

The organization and manner of the structure and operation of the invention, advantages thereof, may best be understood by reference to the following description, taken in connection with the accompanying drawings, wherein like reference numerals identify like elements throughout the views, in which:

FIG. 1 is a front view of an embodiment of a lifting apparatus constructed in accordance with the principles of the present invention;

FIG. 2 is a top view of the lifting apparatus of FIG. 1;

FIG. 3 is fragmentary side view of the apparatus of FIG. 1;

FIG. 4 is a fragmentary back view of the apparatus of FIG. 1;

FIG. 5 is a fragmentary top view of a roller chain connector used by the apparatus of FIG. 1; and FIG. 6 shows a chain tightening arrangement used by the lifting apparatus of FIG. 1.

DETAILED DESCRIPTION OF THE PREFERRED EMBODIMENT

In the description of the preferred embodiment, reference is made to the accompanying drawings which form a part hereof and in which is shown by way of illustration a specific embodiment in which the invention may be practiced. It should be understood that other embodiments may be utilized as structural changes may be made without departing from the scope of the present invention.

The present invention relates generally to an apparatus having a boom extendable from the side door of a van, and the boom being slidably connected to a track and movable along the track between the front and back regions of a cargo area.

FIG. 1 illustrates a van 11 having a lift apparatus 13 constructed in accordance with the principles of the present invention. Two parallel tracks 24 and 25 (best shown in FIG. 2) are mounted on vertical supports 10 within a cargo area 19 of the van 11. The tracks 24 and 25 extend between front and rear regions 7 and 9 of the cargo area 19. A retractable boom 16 is slidably mounted on the tracks 24 and 25. The boom supports a cable 20 that is raised and lowered by a winch 74.

In use of the apparatus 13, the boom 16 is extended and the cable 20 is hooked onto an object desired to be lifted such as an appliance 21. The winch 74 is then used to lift the appliance 21 above a cargo bed 23 of the van 11. Next, the boom 16 is retracted such that the appliance 21 is pulled through the side door into the cargo area 19 of the van 11. Once the appliance 21 is within the cargo area 19, the boom 16 is moved along the tracks to either the front or rear regions 7 and 9 of the cargo area 19. Finally, the winch 74 is used to set the appliance 21 down at the desired location within the cargo area 19.

The boom 16 of the apparatus 13 is mounted within a rectangular support tube 12. Wheels 18 that ride along a cusp of the support tube 12 facilitate telescopically moving the boom 16 relative to the tube 12. As shown in FIG. 2, the tube 12 is connected to two base plates 15 which are secured to the tracks 24 and 25 by sets of roller brackets 14. Referring back to FIG. 1, the support tube 12 has an axial slot or opening 27 that is defined by a bottom floor of the support tube 12. The bottom floor opposes a top ceiling 29 of the support tube 12.

The height of the support members 10 is chosen to allow the object being lifted to be pulled into the interior of the van 11. A boom drive motor (not shown) is attached to the extension boom 16 and configured to drive the boom 16 from an extended orientation to a retracted orientation. In the retracted orientation, the boom 16 is wholly received and is completely set in the support tube 12. When the boom 16 is retracted, the cable 20 extends through the axial slot 27 of the support tube 12. The cable 20 extends throughout the length of the extension boom 16 and is draped over a roller 22 at the posterior end of the extension boom 16. A cable drive motor drives a winch 74 (shown schematically in FIG. 2) that is coupled to the boom 16. The cable 20 is mounted on the boom 16, and the cable drive motor drives the cable from an upper to a lower position via a winding and an unwinding action of the cable 20.

Referring to FIG. 2, the support tube 12 is slidably mounted upon the tracks 24 and 25 by sets of track rollers 28. The track rollers 28 are mounted within the roller brackets 14, and are enabled to be rotational within the roller brackets 14 by an angular-contact ball bearing assembly, but any type of ball bearing assembly may be used in conjunction with the present invention in order to sustain the angular and thrust forces inherent within the track roller assembly. The track rollers 28 are positioned above the tracks 24 and 25, and the support tube base plates 15 are positioned below the tracks 24 and 25. The track rollers 28 come into frictional contact with the tracks 24 and 25, whereas the support tube base plates 15 do not have any frictional contact with the tracks 24 and 25. The support tube base plates 15 are in a tolerance range between 0.75 inches to 0.50 inches below the tracks 24 and 25.

The tracks 24 and 25 are aligned in a perpendicular orientation with regard to the support tube 12. Additionally, the support tube 12 slidably moves in a plurality of translational positions by way of a drive train shown generally as 26. The drive train 26 comprises a track motor 30, engaging members, such as sprockets 32, 34, 36, 38, 40, and 42, connector members, such as roller link chains 44, 46, 48, and a drive shaft 50. While in operation, an output shaft 60 of the track motor 30 moves in either a clockwise or counterclockwise rotation dependent upon the direction that the operator needs to move the support tube 12.

Referring to FIG. 2, the sprocket 32 is operatively connected to the output shaft 60, and the sprocket 34 is operatively connected to the drive shaft 50. The roller chain 44 is entrained about the sprockets 32 and 34. The rotational output of the output shaft 60 of the track motor 30 is transferred to the drive shaft 50 via the sprockets 32, 34 and the roller chain 44. The sprockets 36 and 40 are operatively connected to the drive shaft 50. The sprockets 38 and 42 are respectively mounted on a cylindrical members 62 and 64 which are mounted at the junctures between the support members 10 and the tracks 24 and 25. The roller chain 46 is entrained about sprockets 36 and 38, and roller chain 48 is entrained about sprockets 40 and 42. The rotational output of the drive shaft 50 is transferred to the sprockets 36, 40 which drive roller chains 46 and 48. As will be described later, the roller chains 46 and 48 are operatively connected to the support tube base plates 15 (best shown in FIG. 5). Upon rotational movement of the roller chains 46 and 48, the support tube 12 slidably moves in a translational motion on the tracks 24 and 25 between the front and back regions of the cargo area of the van 11.

In the preferred embodiment, the boom drive motor is a gear motor, but any type of motor capable of providing sufficient torque could be used without departing from the invention. Similarly, in the preferred embodiment, the cable drive motor is a gear motor, but any motor capable of providing sufficient torque could be used without departing from the invention.

The track motor 30 is preferably a gear motor, but any motor capable of providing sufficient torque could be used without departing from the invention. The output shaft 60 projects outward from the motor housing and is coupled to the drive gear 32. A control panel 76 (shown in FIG. 1) is coupled to the support member 10 and the track motor 30, in order to automatically commence or halt the rotation of the drive apparatus and the translational movement of the support tube 12. The control panel 76 can also be used to control the operation of the winch 74, as well as the telescopic movement of the boom 16.

In operation, power transmission initiates with the track motor 30. The output shaft 60 of the track motor 30 transmits rotational power from the sprocket 32 to the track chain 44, whereby rotational power is converted to translational power. The track chain 44 transmits translational power to the sprocket 34. The sprocket 34, which is operatively connected to the drive shaft 50, converts translational power into rotational power. The drive shaft 50 rotates and transmits rotational power to sprockets 36, 40. The sprockets 36, 40 which are integrally connected to track chains 46, 48, convert rotational power into translational power. The track chains 46, 48 are in a closed-loop structure with sprockets 36, 38 and 40, 42, respectively. Due to the support tube 12 operative connection to the track chains 46, 48, the translational power transfer is manifested by the support tube being movable from the front to the back end of the cargo area of a van. The translational power of the support tube is halted by a limit switch 54 operatively connected to the track 24, and a limit switch 55 operatively connected to the opposite end of the track 24.

FIG. 3 shows a side view of the boom 16 and the cable apparatus. The support tube 12 is shown partially from an anterior side view holding the extension boom 16 which is shown partially extended. Wheels 18 are shown attached to the extension boom 16. Even in the fully extended position, a substantial portion of boom 16 remains within the support tube 12. Cable 20 is shown extending out of the anterior end of extension boom 16. Cable 20 extends out the end of the boom 16 over the end roller 22 for attaching to the object to be raised. The track rollers 28 are positioned on the upper edge of the track 24, and the support tube base plate 15 is operatively connected to the roller brackets 14, and is positioned below the lower edge of the track 24.

FIG. 4 illustrates a fragmentary front view of the boom 16 and the track 24 with the rollers 28 on the track 24. Specifically, bottom rollers 52 and a track chainguide 70 are shown. The bottom rollers 52 are operatively connected to support tube flanges 68. The bottom rollers 52 provide stabilization of the posterior roller 28 assembly. The track chain guide 70 is operatively connected to a track chain guide mount 72. The track chain guide mount 72 is operatively connected to the support tube base plate 15. The track chain guides 70 preferably ride above the track chains 46, 48 respectively, and provide stabilization to the chains 46, 48 while in motion. As shown in FIG. 2, the chain guides 70 are aligned along a reference line R that extends between the rollers 28.

FIG. 5 illustrates a fragmentary top view of a roller chain connector 56. The roller chain connector 56 is operatively connected to the pins of the roller chain 46. A similar connector is used for the chain 48. The roller chain connector 56 is attached to the support tube base plate 15 by way of rivets inserted into openings 58. It will be appreciated that any other type of connector unit may be used in conjunction with the present invention in order to connect the roller chain connector 56 to the support tube base plate 15.

Referring back to FIG. 2, the shaft 50 that drives gears 36 and 40 includes a mid-portion 80 positioned between two end portions 82. The mid-portion 80 is connected to the end portions 82 by couplers 84. The end portions 82 are journaled within bearings mounted on slide plates 86. As shown in FIG. 6, the slide plates 86 are connected to the vertical supports 10 by fasteners 85 that extend through horizontally elongated holes 87 defined by the slide plates 86. The slide plates 86 cooperate with chain tighteners 83 to allow chains 46 and 48 to be tightened or loosened. As shown in FIG. 6, each chain tightener includes a bolt 90 threaded through a flange 92 connected to the frame. The tips of the bolts 85 contact the slide plates 86. By threading or unthreading the bolts 90 within the flanges 92, the chains 46 and 48 are loosened or tightened.

The foregoing description of the present invention has been presented for purposes of illustration and description, and is not intended to be exhaustive or to limit the invention to the precise form disclosed. The description was selected to explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

The claimed invention is:

1. A lift apparatus comprising:

two substantially parallel, spaced-apart track members having first and second ends;

a support structure for elevating the track members, the support structure including first posts for supporting the first ends of the track members and second posts for supporting the second ends of the track members;

a winch for raising and lowering a cable;

an extendable boom having a distal end over which the cable of the winch is draped, the extendable boom being telescopically mounted within a boom receiving portion, the boom receiving portion having a bottom side positioned opposite from a top side, the bottom side defining a longitudinal slot for receiving the cable of the boom when the boom is moved to a retracted position within the boom receiving portion, the boom receiving portion extending transversely between the two track members;

roller assemblies corresponding to each of the track members for securing the boom receiving portion to the track members such that the boom receiving portion can slide along the lengths of the track members, the roller assemblies being mounted above the top side of the boom receiving portion with each including two upper rollers that ride above the track members;

a drive shaft that extends between the track members, the drive shaft having end portions received within bearings located near the first ends of the track members;

first gears mounted on the drive shaft and second gears positioned near the second ends of the track members;

drive chains that extend along each of the track members, the drive chains being looped about the first and second gears and including vertically spaced-apart upper and lower portions that extend between the first and second gears, the lower portions of the chains being secured to the boom receiving portion such that the boom receiving portion moves in concert with the lower portions of the chains;

chain guides for stabilizing the upper portions of the chains, the chain guides being positioned along a reference line that extends generally between the upper rollers of the roller assemblies, the chain guides being supported by guide mounts that extend upward from the top side of the boom receiving portion, and the chain guides being adapted to ride over the upper portions of the chains; and a drive motor for rotating the drive shaft, wherein the rotation of the drive shaft causes the chains to move the boom receiving portion along the lengths of the track members.

2. The apparatus of claim 1, wherein the extendable boom is positioned at a door opening of a vehicle and extends along an axis perpendicular to a longitudinal axis of a vehicle frame.

3. The apparatus of claim 1, wherein the boom receiving portion comprises a substantially rectangular tube.

4. The apparatus of claim 3, wherein the extendable boom is wholly received in the tube when the boom is in a retracted position.

5. The apparatus of claim 1, wherein the boom receiving portion is halted by a limit switch positioned near the first ends of the track members and a limit switch positioned near the second ends of the track members.

6. The lift apparatus of claim 1, wherein the roller assemblies each include two lower rollers that ride below the track members.

7. The lift apparatus of claim 6, wherein the lower rollers are spaced farther apart from one another than the upper rollers.

8. The lift apparatus of claim 7, wherein the lower rollers are mounted on plates that project transversely outward from side walls of the boom receiving portion.

9. The lift apparatus of claim 1, wherein the drive shaft includes a mid portion that is connected to the end portions by couplers.

10. The lift apparatus of claim 1, wherein the chain guides comprise rollers.

11. An apparatus for moving appliances comprising:

a vehicle including a cargo area having a front region and a back region, the vehicle also including a door for accessing the cargo area;

two substantially parallel, spaced-apart track members that extend between the front and back regions;

a winch for raising and lowering a cable;

an extendable boom having a distal end over which the cable of the winch is draped, the extendable boom being telescopically mounted within a boom receiving portion and being adapted to project outward through the door of the vehicle when extended relative to the boom receiving portion, the boom receiving portion having a bottom side positioned opposite from a top side, the bottom side defining a longitudinal slot for receiving the cable of the boom when the boom is moved to a retracted position within the boom receiving portion, the boom receiving portion extending transversely between the two track members;

roller assemblies corresponding to each of the track members for securing the boom receiving portion to the track members such that the boom receiving portion can slide along the lengths of the track members, the roller assemblies being mounted above the top side of the boom receiving portion with each including two upper rollers that ride above the track members;

at least one drive chain that extends between the front and back regions of the vehicle, the drive chain being arranged in a looped configuration and including vertically spaced-apart upper and lower portions that extend between the front and back regions, the lower portion of the chain being secured to the boom receiving portion such that the boom receiving portion moves in concert with the lower portion of the chain;

a chain guide for stabilizing the upper portion of the chain, the chain guide being positioned along a reference line that extends generally between the upper rollers of the roller assemblies, the chain guide being supported by a guide mount that extends upward from the top side of the boom receiving portion, and the chain guide being adapted to ride over the upper portion of the chain; and a drive motor for driving the chain to move the boom receiving portion along the lengths of the track members.

12. The apparatus of claim 11, wherein the roller assemblies each include two lower rollers that ride below the track members.

13. The apparatus of claim 12, wherein the lower rollers are spaced farther apart from one another than the upper rollers.

14. The apparatus of claim 13, wherein the lower rollers are mounted on plates that project transversely outward from side walls of the boom receiving portion.

15. The apparatus of claim 11, wherein the chain guide comprises a roller.

16. The apparatus of claim 11, wherein the door of the vehicle comprises a side door.

\* \* \* \* \*